June 29, 1965

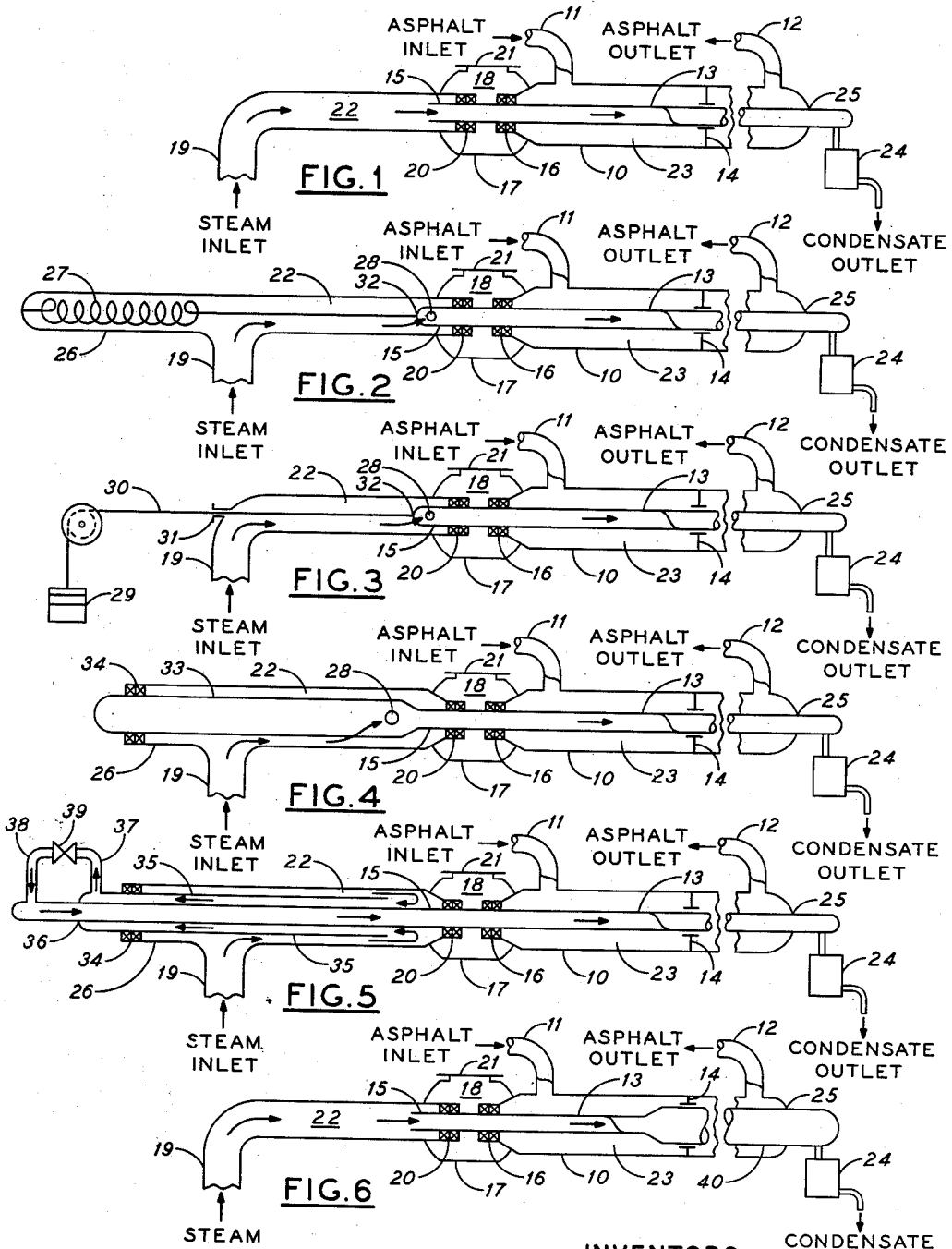

G. H. HORNE ETAL 3,191,671

PIPELINE HEATING SYSTEM

Filed Sept. 23, 1957

INVENTORS
GEORGE H. HORNE
MILTON LUDWIG

BY P.E. Johnston

Ralph L. Freeland Jr.

ATTORNEYS

United States Patent Office 3,191,671
Patented June 29, 1965

3,191,671
PIPELINE HEATING SYSTEM
George H. Horne, Menlo Park, and Milton Ludwig, Kensington, Calif., assignors to California Research Corporation, San Francisco, Calif., a corporation of Delaware
Filed Sept. 23, 1957, Ser. No. 685,627
9 Claims. (Cl. 165—84)

This invention relates to a heating system for a pipeline adapted to convey a fluent material whose consistency varies with temperature changes, and particularly refers to a system for a long straight pipeline conveying heated asphalt or heavy crude oil under water, including an internal conduit for a heating fluid such as steam, together with relatively movable expansion means for preventing distortion or lateral deflection of either the conduit or the pipeline with changes of temperature due to conditions inside or outside of the line.

Heretofore, it has been considered to be impractical to build long, internally heated pipelines, e.g., up to several thousand feet in length, that are subject to periodic or occasional temperature changes without intermediate expansion elements, such as offset loops or U-bends, or a number of accessible, sliding, packed joints at frequent intervals. These not only add to the cost of the line, but are susceptible to leakage and deterioration due to movement from the temperature changes. Also, if the line should extend offshore under water, the intermediate devices require divers for servicing, and leakage problems can be quite serious.

This invention comprehends broadly a straight, undeviating pipeline having a length up to several thousand feet, with an internal heating conduit and a single, accessible, expansion-permitting means, usually at the inlet of both the pipeline and the conduit, for accommodating such longitudinal differential expansion as may be unavoidable under conditions of heating up and cooling down of the pipeline. To prevent lateral distortion, the internal heating conduit is kept in what may be termed progressive tension at all times by novel combinations of mechanical or hydraulic means which will be described in detail below.

It is an object of this invention to provide an internally heated pipeline expansion system that requires only one accessible location where slip-joint packing means are installed, to accommodate occasional or periodic differential expansion totaling several feet in length, between an internal heating conduit and the external, fluid-conveying pipeline. It is particularly, although not necessarily, adapted to a pipeline as long as a mile or more in length conveying a fluent material such as asphalt or heavy crude oil, which changes its viscosity or consistency, through wide ranges with changes in ambient or operating temperature. For example, a submerged or "offshore loading" pipeline carrying asphalt, and subject to periodic shutdowns and startups, may be filled with solidified asphalt during most of the time due to ambient sea water temperature of 50–70° F., and only occasionally will it be heated to 200–300° F. when the asphalt is to be made fluent to have a viscosity of about 1000 Seconds Saybolt Universal, so that it may be pumped through the line with economically attainable pressures.

Another object is to provide an internally heated pipeline system that may be shut down or started up and always maintain a progressive tension on the internal heating fluid conduit, so that buckling or transverse distortion of either line or conduit may be avoided.

Another object is to provide a unitized expansion and heating system for a long length of straight pipeline that may be hermetically sealed and secured against leakage, either inwardly or outwardly.

These and other objects and advantages will be further apparent from the following description of several embodiments illustrating this invention, taken in connection with the attached diagrammatic drawing, which forms a part of this specification.

nI the drawings:

FIG. 1 is a schematic representation of a pipeline system wherein the internal heating conduit is reduced in diameter at one end of the pipeline so that the steam pressure acting upon the differential area will be effective to keep the conduit in progressive tension relative to the pipeline as the temperature varies.

FIG. 2 is a diagrammatic longitudinal sectional view illustrating a modification of the arrangement of FIG. 1, with other internal resilient means for maintaining the internal heating conduit in progressive tension, and suitable for longer lines.

FIG. 3 is a diagrammatic longitudinal sectional view of an alternative arrangement to that of FIG. 2, with an external adjustable weight element for maintaining tension on the heating conduit.

FIG. 4 is a diagrammatic longitudinal sectional view of an alternative arrangement to that of FIGURE 2, in which the internal conduit is enlarged and projects out of a packed connection in the steam supply system into the atmosphere, to provide the desired progressive tension in the remainder of the internal conduit by an hydraulic effect.

FIG. 5 is a diagrammatic longitudinal sectional view of an alternative arrangement to that of FIG. 4, with an additional control valve and flow-directing sleeve so that tension may be applied to the internal conduit before steam is admitted to heat that conduit and the surrounding material in the pipeline.

FIG. 6 is an enlarged longitudinal sectional view of the arrangement shown in FIG. 1.

Figure 7:
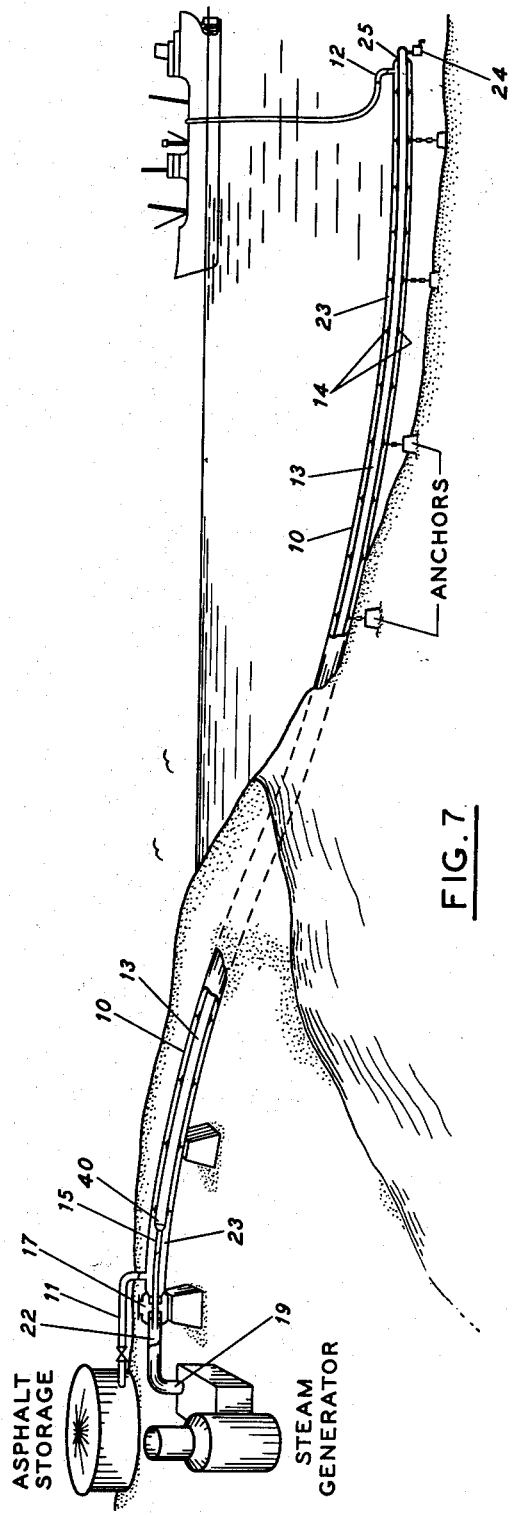
FIG. 7 is a diagrammatic longitudinal sectional view illustrating a simple form of a pipeline expansion joint suitable for relatively short lengths of line, in which the internal heating fluid conduit is slidably connected at one end to the steam supply and to the pipeline.

Referring to the drawings, and particularly to FIG. 7, reference numeral 10 designates a pipeline having an inlet 11 and an outlet 12. Extending throughout line 10 is a smaller diameter internal conduit 13, desirably, but not necessarily, supported on spaced guide members 14. Line 10 may also be internally or externally insulated, but as that forms no part of this invention, it is not illustrated. At its inner end 15, internal conduit 13 projects slidably through a packing gland or stuffing box 16 into a housing 17, secured to the end of line 10, and which may be filled with a sealing liquid 18 such as oil. A steam inlet pipe 19 is secured to the opposite side of housing 17 from its connection to line 10, and is provided with a packing gland 20 aligned with gland 16 and also adapted to receive the inlet end 15 of internal conduit 13. A detachable cover plate 21 is provided for housing 17 to provide access to packing glands 16 and 20. Heating fluid 22, such as steam, is admitted to inlet pipe 19 from any suitable source (not shown) and enters inner conduit 13 to heat the fluent material 23, for example, asphalt or heavy crude oil, in the annulus between conduit 13 and pipeline 10. Condensate at the outer end of conduit 13 is disposed of through a conventional steam trap 24.

The outer ends of pipeline 10 and conduit 13 are secured together at 25 so that there is no relative motion possible between them at that point. It is obvious that the inner conduit 13, while it is carrying the heating fluid 22, will normally be at a higher temperature than the fluent material 23 in pipeline 10 and then the pipeline itself. When the entire installation is started up from an initially cold condition, beginning with the outer pipe 10, the material 23 and the inner conduit 13, all at ambient temperature, which may render the material 23 substantially solid or at least quite viscous, the initial flow of heating fluid into conduit 13 will heat first the inlet end 15, and the temperature along the length of 13 toward the outer ends at 25 will progressively increase. The tendency of inner conduit 13 to increase in length at a rate depending upon its temperature expansion coefficient, will cause inlet end 15 to be progressively urged backwardly through stuffing boxes 16 and 20 so that there will be little tendency to buckle or to distort the relatively small diameter and limber conduit 13. If the material 23 has solidified, it will be similarly progressively melted, freeing the conduit 13 so that this action will be facilitated. The outer ends of conduits 10 and 13, being secured together at 25, will form an abutment that will cause the maximum travel of inner conduit 13 relative to outer pipeline 10 to be at the stuffing boxes just mentioned.

By the same token, after the source of heating fluid 22 is shut off when pumping is terminated, the outer ends of the two lines will cool first, permitting the inner conduit 13 to shrink or contract longitudinally in a progressive manner, beginning at the outer end, until equilibrium conditions are reached. Thus, if the pipeline 10 is of the order of a few hundreds of feet in length, the arrangement of FIG. 7 may be sufficient to hold that conduit in its desired straight position. If, however, pipeline 10 is several thousands of feet long, there may not be sufficient longitudinal stiffness in inner conduit 13 to return it to its extended position during warming-up periods, when it tends to elongate with respect to pipeline 10, so that it would tend to buckle. Additionally, the cumulative effect of the compressive force of the heating fluid in conduit 13, without the normal equal tension in the conduit walls, as well as the friction forces necessary to push the conduit through packing 16 and 20 and guides 14, may aggravate this tendency.

The arrangements of FIGS. 2 to 5, inclusive, provide positive means for maintaining what may be termed progressive tension on inner conduit 13 relative to stuffing boxes 16 and 20 and the anchorage at 25 to the outer end of pipeline 10, as will now be described.

In FIG. 2, the heating fluid inlet 19 is illustrated as having an extended section 26, in which is secured a resilient or elastic member such as helical steel spring 27 attached at 32 to the inner end 15 of inner conduit 13. A port or opening 28 permits heating fluid from 19 to enter conduit 13. During the warming-up period, when inner conduit 13 is expanding more rapidly than pipeline 10, due to the latter's exposure to ambient temperature, the initially stretched spring 27 will contract to keep conduit 13 in tension and in a straight line. During cooling periods, the more rapid contraction of the inner conduit 13 will simply elongate spring 27, maintaining the tension and keeping conduit 13 straight under these conditions.

FIG. 3 illustrates a modification of FIG. 2, showing an adjustable weight 29 attached to a flexible, pulley-supported cable 30 passing through stuffing box 31 to connect at 32 to the end of conduit 13. This acts in the same manner as the spring 27 just described.

FIG. 4 illustrates an arrangement wherein the excess of pressure of the steam or heating fluid source over atmospheric is used hydraulically to exert the desired tension on conduit 13, by virtue of the enlarged diameter section 33 which projects into the atmosphere through a suitable stuffing box 34 at the outer end of steam inlet pipe extension 26. The difference in cross-sectional area between conduit 13 at the point 15 where it passes through stuffing box 20 and the enlarged diameter 33 at stuffing box 34 enables the pressure of the steam heating fluid 22 to provide a force that will exert tension on line 13.

FIG. 5 illustrates a modification of the arrangement of FIG. 4, just discussed, in which an added control may be provided to insure that tension is applied before steam is admitted to the interior of conduit 13. In that arrangement, a sleeve 35, which may be of the same diameter as the enlarged section 33 just discussed, is secured at 36 to the left end of conduit 13 and surrounds that conduit for an appropriate distance inside of extension 26. Short pipe connections 37 and 38, with a valve 39, connect the outer end of sleeve 35 to the interior of conduit 13. The path of the steam flow is indicated by arrows in the figure.

Although a limited number of embodiments involving this invention have been described and illustrated, it is apparent that modifications and changes could be made without departing from its essential features. Accordingly, all such modifications that come within the scope of the appended claims are intended to be embraced thereby.

We claim:

1. In a substantially straight, elongated pipeline for conveying heated asphalt or similar fluent material that will partially solidify along the length of said pipeline at ambient temperatures, said pipeline having an inlet at its inner end and an outlet at its outer end, an internal conduit for heating fluid extending throughout said pipeline and secured thereto only at its outer end, means for supplying heating fluid to the inlet of said conduit, means for withdrawing spent heating fluid at the outer end of said conduit, means for preventing lateral distortion of said pipeline and said conduit relative to each other and to maintain said pipeline substantially straight, comprising a single slidable fluid-tight connection between said conduit and said pipeline adjacent to their respective inlets and means for maintaining said conduit in progressive longitudinal tension relative to said pipeline and independently of changes in temperature in said fluent material to prevent buckling distortion of said heating fluid conduit within said pipeline due to longitudinal expansion and contraction thereof relative to said pipeline.

2. A pipeline according to claim 1, in which said last-named means comprises an abutment secured to the inner end of said pipeline and tension-producing means connecting said abutment and the inner end of said conduit for the purpose described.

3. A pipeline according to claim 2, in which said tension-producing means comprises a spring.

4. A pipeline according to claim 2, in which said tension-producing means comprises a weight.

5. A pipeline according to claim 1, in which said last-named means comprises an enclosed elongated abutment secured at one end to the inner end of said pipeline and communicating with said heating fluid inlet, a slidable packed closure for the other end of said abutment, and means connected to the inner end of said conduit extending through said closure, said means being larger in diameter than the diameter of said conduit where it extends through said slidable connection to said pipeline.

6. A pipeline according to claim 5, with the addition of valve means connecting said enclosed abutment and the interior of said conduit for applying tension to the latter before heating fluid is admitted thereto.

7. A pipeline according to claim 1 filled with asphalt or similar fluent material in the annular space between said conduit and said pipeline, said material having a thermal capacity sufficient to maintain a temperature difference between said conduit and said pipeline, and said conduit is maintained under said progressive longitudinal tension by solidification of said material at substantially atmospheric temperature along the length of said pipeline to a point adjacent said slidable connection.

8. A hot fluid transmission system for asphaltic materials comprising an elongated, undeviatingly straight pipeline, a unitary fluid conductor pipe coextensive within said pipeline, means for securing one end of said conductor pipe to an end of said pipeline, means for supplying heating fluid to an inlet communicating with said conductor pipe to heat the asphaltic material in said pipeline and whereby said conductor pipe thermally expands in an axial direction relative to said pipeline, and means for centrally supporting the opposite end of said conductor pipe to permit unrestrained axial expansion of said opposite end of said conductor pipe relative to said pipeline during changes in operating temperatures of both said conductor pipe and said pipeline, and means for maintaining said conductor pipe in progressive longitudinal tension to prevent buckling of said conductor pipe within said pipeline when said operating temperatures vary.

9. A pipeline according to claim 1, in which that portion of the heating fluid conduit which extends through said slidable fluid-tight connection is smaller in diameter than the remainder of said conduit in said pipeline.

References Cited by the Examiner
UNITED STATES PATENTS

| | | | |
|---|---|---|---|
| 464,706 | 12/91 | Burns | 285—134 |
| 1,527,310 | 2/25 | Kinzbach | 285—41 |
| 1,960,866 | 5/34 | Chadwick | 138—32 |
| 2,313,322 | 3/43 | Carpenter | 285—134 |
| 2,445,115 | 7/48 | Hanrahan | 165—141 |
| 2,549,687 | 4/51 | Jack et al. | 165—156 |
| 2,643,138 | 6/53 | Jacobs et al. | 285—5 |
| 2,683,592 | 7/54 | Birney | 165—143 |
| 2,712,438 | 7/55 | Brown | 165—154 |
| 2,787,124 | 4/57 | Donahue | 148—6.15 |
| 2,790,310 | 4/57 | Green | 62—5 |

FOREIGN PATENTS 6,285   2/11   Great Britain.

CHARLES SUKALO, *Primary Examiner.*

HERMAN BERMAN, EUGENE J. BLANCHARD, PERCY L. PATRICK, ROBERT A. O'LEARY, *Examiners.*

UNITED STATES PATENT OFFICE
CERTIFICATE OF CORRECTION

Patent No. 3,191,671                                                June 29, 1965

George H. Horne et al.

It is hereby certified that error appears in the above numbered patent requiring correction and that the said Letters Patent should read as corrected below.

Column 2, line 5, for "nI" read -- In --; lines 6, 13 and 14, and 35, for "FIG. 1", each occurrence, read -- FIG. 7 --; line 36, for "FIG. 7" read -- FIG. 1 --; line 41, before "the" insert -- FIG. 1 of --; same line 41, after "FIG. 7" insert -- having corresponding reference numerals to those shown in FIG. 1 --; column 3, line 37, for "5" read -- 6 --; column 4, line 7, for "the" read -- this --; same column 4, after line 7, insert the following:

> FIGS. 7 and 6 illustrate what may be termed a reversal of the arrangements of FIGS. 4 and 5, in which the major portion of conduit 13, within pipeline 10, is larger in diameter as at 40, than is its diameter at stuffing box 16. This provides a longitudinal or axial tensile force in the walls of the enlarged portion 40 of the conduit, thereby substantially offsetting the compressive force of the heat fluid 22 within that would be present if both ends of conduit 40 were anchored, as at 25. The differential area between the two diameters just mentioned, under the influence of the higher pressure of the steam heating fluid inside conduit 13 than that in the annulus between the conduit and pipeline 10, exerts a longitudinal force tending to hold conduit 13 in tension when asphalt or the like first solidifies adjacent packing gland 16, and to urge the smaller diameter inlet section 15 to the left through stuffing box 16, as previously discussed. It will be noted in FIG. 6 that the transition section between the two diameters of conduit 13 is directly adjacent gland 16 in housing 17.

Signed and sealed this 15th day of March 1966.

(SEAL)
Attest:

ERNEST W. SWIDER                          EDWARD J. BRENNER
Attesting Officer                       Commissioner of Patents